United States Patent
Nishiguchi et al.

(10) Patent No.: US 12,479,798 B2
(45) Date of Patent: Nov. 25, 2025

(54) METHOD FOR PRODUCING PYRROLIDINE COMPOUND

(71) Applicant: TAKEDA PHARMACEUTICAL COMPANY LIMITED, Osaka (JP)

(72) Inventors: Atsuko Nishiguchi, Osaka (JP); Yoshihiro Banno, Kanagawa (JP)

(73) Assignee: Takeda Pharmaceutical Company Limited, Osaka (JP)

( * ) Notice: Subject to any disclaimer, the term of this patent is extended or adjusted under 35 U.S.C. 154(b) by 708 days.

(21) Appl. No.: 17/777,943

(22) PCT Filed: Nov. 18, 2020

(86) PCT No.: PCT/JP2020/042891
§ 371 (c)(1),
(2) Date: May 18, 2022

(87) PCT Pub. No.: WO2021/100730
PCT Pub. Date: May 27, 2021

(65) Prior Publication Data
US 2022/0411369 A1    Dec. 29, 2022

(30) Foreign Application Priority Data
Nov. 19, 2019  (JP) .................................. 2019-209070

(51) Int. Cl.
*C07D 207/14*    (2006.01)
(52) U.S. Cl.
CPC .................................. *C07D 207/14* (2013.01)
(58) Field of Classification Search
CPC .................................................. C07D 204/14
See application file for complete search history.

(56) References Cited

FOREIGN PATENT DOCUMENTS

| JP | 4-13659 A | 1/1992 |
|---|---|---|
| JP | 2002-531558 A | 9/2002 |
| JP | 2022-371060 A | 12/2022 |
| WO | WO 1999-50261 A1 | 7/1999 |
| WO | WO 2019-027058 A1 | 2/2019 |

OTHER PUBLICATIONS

English Translation of International Search Report for International Appl. No. PCT/JP2020/042891 mailed Jan. 19, 2021, 2 pages.
English Translation of Written Opinion of the International Searching Authority for International Appl. No. PCT/JP2020/042891 dated Jan. 19, 2021, 3 pages.

*Primary Examiner* — Kamal A Saeed
(74) *Attorney, Agent, or Firm* — Sterne, Kessler, Goldstein & Fox P.L.L.C.

(57) ABSTRACT

The present invention provides a production method suitable for industrial production of (2S,3S)-3-amino-2-(3-bromo-2-fluorobenzyl)pyrrolidine having a protecting group at the 1-position.

The present invention is a method for producing N-[(4-methylphenyl)sulfonyl]-L-phenylalanine salt of (2S,3S)-3-amino-2-(3-bromo-2-fluorobenzyl)pyrrolidine having a protecting group at the 1-position, which comprises Step 2: a step of subjecting 2-(3-bromo-2-fluorobenzyl)-3-(methoxyimino)pyrrolidine having a protecting group at the 1-position to a reduction reaction; and Step 3: a step of subjecting the product obtained in Step 2 to optical resolution using salt formation with N-[(4-methylphenyl)sulfonyl]-L-phenylalanine.

5 Claims, No Drawings

METHOD FOR PRODUCING PYRROLIDINE COMPOUND

TECHNICAL FIELD

The present invention relates to a method for producing a pyrrolidine compound.

BACKGROUND OF THE INVENTION

Pyrrolidine compounds, for example, (2S,3S)-3-amino-2-(3-bromo-2-fluorobenzyl)pyrrolidine having a protecting group at the 1-position is useful as an intermediate in the manufacture of pharmaceuticals, and a production method thereof suitable for industrial production is desired.

SUMMARY OF THE INVENTION

Problems to be Solved by the Invention

The present invention aims to provide a production method suitable for industrial production of (2S,3S)-3-amino-2-(3-bromo-2-fluorobenzyl)pyrrolidine having a protecting group at the 1-position.

Means of Solving the Problems

The present inventors have conducted intensive studies in an attempt to solve the above-mentioned problems and found that 3-amino-2-(3-bromo-2-fluorobenzyl)pyrrolidine having a protecting group at the 1-position can be obtained by the method using 2-(3-bromo-2-fluorobenzyl)-3-oxopyrrolidine having a protecting group at the 1-position as a starting material, via 2-(3-bromo-2-fluorobenzyl)-3-(methoxyimino)pyrrolidine having a protecting group at the 1-position, and that (2S,3S)-3-amino-2-(3-bromo-2-fluorobenzyl)pyrrolidine having a protecting group at the 1-position can be obtained as a salt by subjecting the compound obtained above to optical resolution using salt formation with a certain chiral acid, which resulted in the completion of the present invention.

Accordingly, the present invention relates to the followings.

[1]
A method for producing N-[(4-methylphenyl)sulfonyl]-L-phenylalanine salt of (2S,3S)-3-amino-2-(3-bromo-2-fluorobenzyl)pyrrolidine having a protecting group at the 1-position, which comprises
Step 2: a step of subjecting 2-(3-bromo-2-fluorobenzyl)-3-(methoxyimino)pyrrolidine having a protecting group at the 1-position to a reduction reaction; and
Step 3: a step of subjecting the product obtained in Step 2 to is optical resolution using salt formation with N-[(4-methylphenyl)sulfonyl]-L-phenylalanine.

[2]
The method according to claim 1, wherein the reduction reaction is carried out in the presence of zirconium(IV) chloride.

[3]
tert-Butyl (2S,3S)-3-amino-2-(3-bromo-2-fluorobenzyl)pyrrolidine-1-carboxylate N-[(4-methylphenyl)sulfonyl]-L-phenylalanine salt.

[4]
A method for producing 2-(3-bromo-2-fluorobenzyl)-3-(methoxyimino)pyrrolidine having a protecting group at the 1-position, which comprises Step 1: a step of reacting 2-(3-bromo-2-fluorobenzyl)-3-oxopyrrolidine having a protecting group at the 1-position with O-methylhydroxylamine or a salt thereof.

[5]
tert-Butyl 2-(3-bromo-2-fluorobenzyl)-3-(methoxyimino)pyrrolidine-1-carboxylate.

Effect of the Invention

According to the production method of the present invention, (2S,3S)-3-amino-2-(3-bromo-2-fluorobenzyl)pyrrolidine having a protecting group at the 1-position can be obtained as N-[(4-methylphenyl)sulfonyl]-L-phenylalanine salt by a method suitable for industrial production.

DETAILED DESCRIPTION OF THE INVENTION

The production method of the present invention is explained below.

The compound obtained in each step can be used directly as a reaction mixture or as a crude product for the next reaction. Alternatively, the compound obtained in each step can be isolated and purified from a reaction mixture according to a method known per se, for example, a separation means such as concentration, crystallization, recrystallization, distillation, solvent extraction, fractional distillation, column chromatography and the like.

When the raw material compound and reagent used in each step are commercially available, the commercially available product can also be used directly.

Unless otherwise specified, the reaction in each step is carried out without solvent, or by dissolving or suspending the raw material compound in a suitable solvent. Examples of the solvent include those described in Examples and the following solvents.

alcohols: methanol, ethanol, tert-butyl alcohol, 2-methoxyethanol, 1-propanol, 2-propanol and the like;
ethers: diethyl ether, diisopropyl ether, cyclopentyl methyl ether (CPME), diphenyl ether, tetrahydrofuran (THF), 1,2-dimethoxyethane, 1,4-dioxane, cyclopentyl methyl ether and the like;
aromatic hydrocarbons: chlorobenzene, toluene, xylene and the like;
saturated hydrocarbons: cyclohexane, hexane and the like;
amides: N,N-dimethylformamide, N,N-dimethylacetamide, N-methylpyrrolidone and the like;
halogenated hydrocarbons: dichloromethane, carbon tetrachloride and the like;
nitriles: acetonitrile and the like;
sulfoxides: dimethyl sulfoxide and the like;
organic bases: pyridine, triethylamine and the like;
anhydrides: acetic anhydride and the like;
organic acids: formic acid, acetic acid, trifluoroacetic acid and the like;
inorganic acids: hydrochloric acid, sulfuric acid and the like; is esters: ethyl acetate, isopropyl acetate and the like;
ketones: acetone, methyl ethyl ketone and the like;
water.

The above-mentioned solvent can be used in a mixture of two or more kinds thereof in an appropriate ratio.

When a base is used for the reaction in each step, examples thereof include the following bases and those described in Examples.

inorganic bases: sodium hydroxide, magnesium hydroxide, sodium carbonate, calcium carbonate, sodium hydrogencarbonate, potassium carbonate, sodium acetate, lithium hydroxide, tripotassium phosphate and the like;

organic bases: triethylamine, diethylamine, diisopropylethylamine, pyridine, 4-dimethylaminopyridine, N,N-dimethylaniline, 1,4-diazabicyclo[2.2.2]octane, 1,8-diazabicyclo[5.4.0]-7-undecene, imidazole, piperidine and the like;

metal alkoxides: sodium methoxide, sodium ethoxide, potassium tert-butoxide, sodium tert-butoxide, lithium ethoxide and the like;

alkali metal hydrides: sodium hydride and the like;

metal amides: sodium amide, lithium diisopropylamide, lithium hexamethyldisilazide and the like;

organic lithiums: n-butyllithium and the like.

In the various pyrrolidine compounds used as raw materials or products in the production method of the present invention, examples of the protecting group for the 1-position of the pyrrolidine include a tert-butoxycarbonyl group, a benzyloxycarbonyl group, an acetyl group, a trityl group, a benzyl group, a 9-fluorenylmethyloxycarbonyl group (Fmoc group), a 2,2,2-trichloroethoxycarbonyl group (Troc group), a methoxymethyl group (MOM group) and the like, and the preferred is a tert-butoxycarbonyl group in terms of easy deprotection.

In the present invention, the method for producing N-[(4-methylphenyl)sulfonyl]-L-phenylalanine salt of (2S,3S)-3-amino-2-(3-bromo-2-fluorobenzyl)pyrrolidine having a protecting group at the 1-position comprises Step 1: a step of reacting 2-(3-bromo-2-fluorobenzyl)-3-oxopyrrolidine having a protecting group at the 1-position with O-methylhydroxylamine or a salt thereof to give 2-(3-bromo-2-fluorobenzyl)-3-(methoxyimino)pyrrolidine having a protecting group at the 1-position;

Step 2: a step of subjecting 2-(3-bromo-2-fluorobenzyl)-3-(methoxyimino)pyrrolidine having a protecting group at the 1-position to a reduction reaction; and Step 3: a step of subjecting the product obtained in Step 2 to optical resolution using salt formation with N-[(4-methylphenyl)sulfonyl]-L-phenylalanine.

Step 1

In this step, 2-(3-bromo-2-fluorobenzyl)-3-oxopyrrolidine having a protecting group at the 1-position is reacted with O-methylhydroxylamine or a salt thereof to give 2-(3-bromo-2-fluorobenzyl)-3-(methoxyimino)pyrrolidine having a protecting group at the 1-position.

The 2-(3-bromo-2-fluorobenzyl)-3-oxopyrrolidine having a protecting group at the 1-position is preferably tert-butyl 2-(3-bromo-2-fluorobenzyl)-3-oxopyrrolidine-1-carboxylate. The compound can be produced according to a method known per se.

Examples of the salt of O-methylhydroxylamine include O-methylhydroxylamine hydrochloride and the like. The amount of the O-methylhydroxylamine or a salt thereof to be used is generally 1.4 to 2.0 mol, preferably 1.6 to 1.8 mol, and in another embodiment, generally 1.2 to 1.6 mol, preferably 1.3 to 1.5 mol, per 1 mol of the 2-(3-bromo-2-fluorobenzyl)-3-oxopyrrolidine having a protecting group at the 1-position.

When the salt of O-methylhydroxylamine is used, the reaction is carried out in the presence of a base. Examples of the base include organic bases, inorganic bases and the like. The amount of the base to be used is generally 1.0 to 1.3 mol, preferably 1.0 to 1.1 mol, per 1 mol of the salt of O-methylhydroxylamine.

The reaction is carried out generally in a solvent. Examples of the solvent include alcohols; ethers; and the like. The solvent is preferably ethanol.

The reaction is carried out generally at 45 to 65° C., preferably at 50 to 60° C. The reaction time is generally about 10 min to about 3 hr, preferably about 3 min to about 1 hr.

After the completion of the reaction, the 2-(3-bromo-2-fluorobenzyl)-3-(methoxyimino)pyrrolidine having a protecting group at the 1-position can be isolated from the reaction mixture by a conventional post-treatment such as liquid separation, concentration and the like.

Among the 2-(3-bromo-2-fluorobenzyl)-3-(methoxyimino)pyrrolidine having a protecting group at the 1-position obtained in this step, tert-butyl 2-(3-bromo-2-fluorobenzyl)-3-(methoxyimino)pyrrolidine-1-carboxylate is a novel compound.

Step 2

In this step, 2-(3-bromo-2-fluorobenzyl)-3-(methoxyimino)pyrrolidine having a protecting group at the 1-position is subjected to a reduction reaction.

The reaction is carried out by reacting 2-(3-bromo-2-fluorobenzyl)-3-(methoxyimino)pyrrolidine having a protecting group at the 1-position with a reducing agent.

Examples of the reducing agent include sodium borohydride, sodium triacetoxyborohydride, sodium cyanoborohydride, lithium borohydride and the like. The amount of the reducing agent to be used is generally 10.0 to 15.6 mol, preferably 12.0 to 13.6 mol, and in another embodiment, generally 7.0 to 10.9 mol, preferably 8.4 to 9.5 mol, per 1 mol of the 2-(3-bromo-2-fluorobenzyl)-3-(methoxyimino)pyrrolidine having a protecting group at the 1-position. In addition, the amount of the reducing agent to be used is generally 5.0 to 7.8 mol, preferably 6.0 to 6.8 mol, based on 1 mol of the 2-(3-bromo-2-fluorobenzyl)-3-oxopyrrolidine having a protecting group at the 1-position, which is the starting material in Step 1.

The reaction may be carried out in the presence of zirconium(IV) chloride for the purpose of promotion of the reduction reaction. The amount of zirconium(IV) chloride to be used is generally 2.4 to 4.0 mol, preferably 3.0 to 3.4 mol, per 1 mol of the 2-(3-bromo-2-fluorobenzyl)-3-(methoxyimino)pyrrolidine having a protecting group at the 1-position. In addition, the amount of zirconium(IV) chloride to be used is generally 1.2 to 2.0 mol, preferably 1.5 to 1.7 mol, based on 1 mol of the 2-(3-bromo-2-fluorobenzyl)-3-oxopyrrolidine having a protecting group at the 1-position, which is the starting material in Step 1.

The reaction is carried out generally in a solvent. Examples of the solvent include ethers, alcohols, aromatic hydrocarbons and the like. The solvent is preferably a mixed solvent of tetrahydrofuran, chlorobenzene and cyclopentyl methyl ether.

The reaction is carried out generally at 15 to 35° C., preferably at 20 to at 30° C. The reaction time is generally about 10 min to about 3 hr, preferably about 30 min to about 1 hr.

After the completion of the reaction, the 3-amino-2-(3-bromo-2-fluorobenzyl)pyrrolidine having a protecting group at the 1-position can be isolated from the reaction mixture by a conventional post-treatment such as liquid separation, concentration and the like.

In the reaction, the 3-amino-2-(3-bromo-2-fluorobenzyl)pyrrolidine having a protecting group at the 1-position is produced as a mixture (mol ratio=2.5/1 to 1.5/1) of cis-form ((2S,3S) and (2R,3R))/trans-form ((2R,3S) and (2S,3R)).

Step 3

In this step, the product obtained in Step 2 is subjected to optical resolution using salt formation with N-[(4-methylphenyl)sulfonyl]-L-phenylalanine to give N-[(4-methylphenyl)sulfonyl]-L-phenylalanine salt of (2S,3S)-3-amino-2-(3-bromo-2-fluorobenzyl)pyrrolidine having a protecting group at the 1-position.

The optical resolution is carried out by mixing the product obtained in Step 2 with N-[(4-methylphenyl)sulfonyl]-L-phenylalanine in a solvent, and then collecting the resulting precipitated crystal by filtration.

The amount of N-[(4-methylphenyl)sulfonyl]-L-phenylalanine to be used is generally 1.12 to 1.68 mol, preferably 1.26 to 1.54 mol, and in another embodiment, generally 1.0 to 1.6 mol, preferably 1.2 to 1.4 mol, per 1 mol of the (2S,3S)-3-amino-2-(3-bromo-2-fluorobenzyl)pyrrolidine having a protecting group at the 1-position, which is contained in the product obtained in Step 2. In addition, the amount of N-[(4-methylphenyl)sulfonyl]-L-phenylalanine to be used is generally 0.80 to 1.20 mol, preferably 0.90 to 1.10 mol, and in another embodiment, generally 0.50 to 0.80 mol, preferably 0.60 to 0.70 mol, based on 1 mol of the 2-(3-bromo-2-fluorobenzyl)-3-oxopyrrolidine having a protecting group at the 1-position, which is the starting material in Step 1.

Examples of the solvent for mixing the product obtained in Step 2 with N-[(4-methylphenyl)sulfonyl]-L-phenylalanine include alcohols, ethers, aromatic hydrocarbons and the like. The solvent is preferably ethanol.

The mixing is carried out by addition (preferably dropwise addition) of a solution of N-[(4-methylphenyl)sulfonyl]-L-phenylalanine to a solution of the product obtained in Step 2 under stirring. The addition temperature is generally 45 to 70° C., preferably 50 to at 60° C. After the addition, the mixture is aged under stirring generally at 50 to 70° C., preferably at 55 to 65° C. for about 12 to about 18 hr, and then generally at 15 to 35° C., preferably at 20 to at 30° C. for about 15 hr to about 35 hr, preferably about 18 hr to about 24 hr.

The above operations precipitate crystals of N-[(4-methylphenyl)sulfonyl]-L-phenylalanine salt of (2S,3S)-3-amino-2-(3-bromo-2-fluorobenzyl)pyrrolidine having a protecting group at the 1-position. The precipitated crystals are collected by filtration, and recrystallized from a solvent such as an alcohol, an ether, an aromatic hydrocarbon and the like, if necessary.

Among the N-[(4-methylphenyl)sulfonyl]-L-phenylalanine salt of (2S,3S)-3-amino-2-(3-bromo-2-fluorobenzyl)pyrrolidine having a protecting group at the 1-position obtained in this step, tert-butyl (2S,3S)-3-amino-2-(3-bromo-2-fluorobenzyl)pyrrolidine-1-carboxylate N-[(4-methylphenyl)sulfonyl]-L-phenylalanine salt is a novel compound.

EXAMPLES

The present invention is explained in detail in the following by referring to Examples, which are not to be construed as limitative, and the invention may be changed within the scope of the present invention.

In the following Examples, the "room temperature" generally means about 10° C. to about 35° C. The ratios indicated for mixed solvents are volume mixing ratios, unless otherwise specified. % means wt %, unless otherwise specified.

The elution by column chromatography in the Examples was performed under the observation by TLC (Thin Layer Chromatography) unless otherwise specified. In the observation by TLC, 60 $F_{254}$ manufactured by Merck was used as a TLC plate, the solvent used as an elution solvent in column chromatography was used as a developing solvent, and UV detector was used for the detection. In silica gel column chromatography, the indication of NH means use of aminopropylsilane-bonded silica gel and the indication of Diol means use of 3-(2,3-dihydroxypropoxy) propylsilane-bonded silica gel. In preparative HPLC (high performance liquid chromatography), the indication of C18 means use of octadecyl-bonded silica gel. The ratio for elution solvent is, unless otherwise specified, a volume mixing ratio.

In the following Examples, the following abbreviations are used.

M: mol concentration

N: normality

HPLC: high performance liquid chromatography

Reference Example 1 tert-butyl 2-(3-bromo-2-fluorobenzyl)-3-oxopyrrolidine-1-carboxylate (TBFO)

tert-Butyl 3-oxopyrrolidine-1-carboxylate (TOPC) (21.3 g) and toluene (193 ml) were placed into a reaction container, pyrrolidine (10.2 g) was added dropwise thereto at 40° C. or lower, and the mixture was stirred for 10 min. The reaction solution was concentrated to 97 ml. To the concentrate was added toluene (97 ml), and the mixture was concentrated to 97 ml. To the concentrate was added acetonitrile (77 ml), and tetrabutylammonium iodide (0.532 g) was added thereto. An acetonitrile solution (19 ml) of 2-bromo-6-bromomethyl-1-fluorobenzene (BBFB) (19.3 g) was added dropwise thereto at 30° C., and the mixture was stirred at 40° C. for 3 hr. Water (116 ml) and ethyl acetate (154 ml) were added thereto at 5 to 30° C. The pH was adjusted to 2.0 by dropwise addition of 2N—HCl at 25° C. The reaction solution was subjected to liquid separation, and the aqueous layer was extracted twice with ethyl acetate (77 ml). The organic layers were combined, and washed with 5% aqueous $Na_2S_2O_3$ solution (135 ml) and 5% aqueous NaCl solution (135 ml). The organic layer was concentrated to 58 ml, ethanol (97 ml) was added thereto, and the mixture was again concentrated to 58 ml. Ethanol (58 ml) was added thereto to give a TBFO ethanol solution.

<HPLC Analysis Conditions> column: YMC-Pack Pro C18 (YMC Co., Ltd., model No. AS12S05-1546WT), column size 4.6×150 mm, particle size 5 μm, pore size 12 nm column temperature: constant temperature around 40° C.

mobile phase:

Solution A) 0.1% $H_3PO_4$

Solution B) MeCN gradient program

TABLE 1

| Time (min) | Solution A (%) | Solution B (%) |
|---|---|---|
| 0 | 70 | 30 |
| 15 | 30 | 70 |
| 35 | 30 | 70 |
| 35.1 | 70 | 30 |
| 40 | 70 | 30 | flow rate: 1.0 ml/min retention time: BBFB 15.6 min, TBFO 16.2 min

Example 1 tert-butyl 2-(3-bromo-2-fluorobenzyl)-3-methoxyimino)pyrrolidine-1-carboxylate (TBFM)

The TBFO ethanol solution (total amount) obtained in Reference Example 1 was placed into a reaction container, water (9.7 ml), sodium acetate (8.28 g) and $H_2NOMe \cdot HCl$ (8.42 g) were added thereto at 20° C., and the mixture was stirred at 55° C. for 1 hr. To the reaction solution were added ethyl acetate (193 ml) and water (193 ml) at 25° C., and the mixture was stirred, and subjected to liquid separation. The organic layer was washed with 0.5M HCl (193 ml), 5% aqueous $NaHCO_3$ solution (193 ml) and water (193 ml) at 25° C. The organic layer was concentrated to 57 ml. To the concentrate was added cyclopentyl methyl ether (CPME) (193 ml), and the mixture was concentrated to 57 ml to give a TBFM CPME solution.

<HPLC Analysis Conditions>
column: YMC-Pack Pro C18 (YMC Co., Ltd., model No. AS12S05-1546WT), column size 4.6×150 mm, particle size 5 μm, pore size 12 nm
column temperature: constant temperature around 40° C.
to mobile phase:
Solution A) 0.1% $H_3PO_4$
Solution B) MeCN
gradient program

TABLE 2

| Time (min) | Solution A (%) | Solution B (%) |
|---|---|---|
| 0 | 70 | 30 |
| 15 | 20 | 80 |
| 35 | 20 | 80 |
| 35.1 | 70 | 30 |
| 40 | 70 | 30 | flow rate: 1.0 ml/min
retention time: TBFO 14.3 min, TBFM 16.8 and 16.9 min

Example 2 tert-butyl (2S,3S)-3-amino-2-(3-bromo-2-fluorobenzyl)pyrrolidine-1-carboxylate N-[(4-methylphenyl)sulfonyl]-L-phenylalanine salt ((2S,3S)-TABF (S)-PPSP)

$ZrCl_4$ (26.92 g) and chlorobenzene (34.4 ml) were placed into a reaction container and suspended. THF (232 ml) was added dropwise thereto at 40° C. or lower, and the mixture was stirred at 50° C. for 1 hr or longer. $NaBH_4$ (17.48 g) was added thereto by portions at 25° C., and the used container was washed with THF (9 ml), and the mixture was stirred at 25° C. for 2 hr or longer. The TBFM CPME solution (total amount) obtained in Example 1 was added dropwise thereto at 25° C., and the used container was washed with CPME (17.2 ml), and the mixture was stirred at 25° C. for 1 hr or longer. 1N—HCl (344 ml) was added dropwise thereto at −5 to 20° C., and the used container was washed with CPME (17.2 ml). The mixture was stirred at 5° C. for 1 hr or longer. Rochelle salt ((+)-potassium sodium tartrate tetrahydrate) (130.41 g) was added thereto at −5 to 10° C., and the mixture was stirred at −5 to 10° C., and then at 35° C., and subjected to liquid separation. To the aqueous layer was added ethyl acetate (172 ml), and the mixture was subjected to liquid separation. The organic layers were combined, and washed with 5% aqueous $NaHCO_3$ solution (172 ml) and 10% aqueous NaCl solution (172 ml). The organic layer was concentrated to 61 ml. To the concentrate was added ethanol (86 ml), and the mixture was concentrated to 52 ml. To the concentrate was added ethanol (86 ml), the mixture was concentrated to 52 ml, and ethanol (46 ml) was added thereto. Separately, N-[(4-methylphenyl)sulfonyl]-L-phenylalanine ((S)-PPSP) (14.76 g) and ethanol (172 ml) were placed into another container, and the mixture was dissolved by heating to 55° C. The solution was added dropwise to the TABF ethanol solution obtained above at 55° C., and the used container was washed with ethanol (6 ml). Seed crystals (25 mg) of (2S,3S)-TABF (S)-PPSP were added thereto at 50° C., the mixture was stirred at 25° C. for 15 hr or longer, and the crystals were collected by filtration, and dried under reduced pressure to give a crude (2S,3S)-TABF (S)-PPSP. As the above seed crystals, those that were naturally crystallized through the same process as described above were used.

<HPLC Analysis Conditions>
column: YMC-Pack Pro C18RS (YMC Co., Ltd., model No. RSO8S05-1546WT), column size 4.6×150 mm, particle size 5 μm, pore size 8 nm
column temperature: constant temperature around 25° C.
mobile phase:
Solution A) 0.03 mol/L aqueous dipotassium hydrogen phosphate solution
Solution B) MeCN
gradient program

TABLE 3

| Time (min) | Solution A (%) | Solution B (%) |
|---|---|---|
| 0 | 90 | 10 |
| 2 | 90 | 10 |
| 15 | 30 | 70 |
| 30 | 30 | 70 |
| 33 | 90 | 10 |
| 40 | 90 | 10 | flow rate: 1.0 ml/min
retention time: (S)-PPSP 9.7 min, TABF 15.5 min
column: CHIRALPAK IG (Daicel Co., Ltd., model No. 87324),
column size 4.6×150 mm, particle size 5 μm
column temperature: constant temperature around 25° C.
mobile phase:
Solution A) 0.01 mol/L aqueous dipotassium hydrogen phosphate solution
Solution B) MeCN
gradient program

TABLE 4

| Time (min) | Solution A (%) | Solution B (%) |
|---|---|---|
| 0 | 55 | 45 |
| 7 | 55 | 45 |
| 10 | 20 | 80 |
| 20 | 20 | 80 |
| 22 | 55 | 45 |
| 30 | 55 | 45 | flow rate: 1.0 ml/min
retention time: (2S,3S)-TABF 7 min, (2R,3R)-TABF 15 min

Example 3 tert-butyl (2S,3S)-3-amino-2-(3-bromo-2-fluorobenzyl)pyrrolidine-1-carboxylate N-[(4-methylphenyl)sulfonyl]-L-phenylalanine salt ((2S,3S)-TABF (S)-PPSP)

The crude (2S,3S)-TABF (S)-PPSP (23 g) obtained in Example 2 was suspended in ethanol (345 ml), and dissolved by heating to 70° C. or higher. The solution was cooled to 25° C., and stirred for 2 hr or longer, and the crystals were collected by filtration, and dried under reduced pressure to give (2S,3S)-TABF (S)-PPSP.

<HPLC Analysis Conditions> column: YMC-Pack Pro C18RS (YMC Co., Ltd., model No. RSO8S05-1546WT), column size 4.6×150 mm, particle size 5 µm, pore size 8 nm column temperature: constant temperature around 25° C.

mobile phase:

Solution A) 0.03 mol/L aqueous dipotassium hydrogen phosphate solution

Solution B) MeCN gradient program

TABLE 5

| Time (min) | Solution A (%) | Solution B (%) |
|---|---|---|
| 0 | 90 | 10 |
| 2 | 90 | 10 |
| 15 | 30 | 70 |
| 30 | 30 | 70 |
| 33 | 90 | 10 |
| 40 | 90 | 10 | flow rate: 1.0 ml/min retention time: (S)-PPSP 9.7 min, TABF 15.5 min column: CHIRALPAK IG (Daicel Co., Ltd., model No. 87324), column size 4.6×150 mm, particle size 5 µm column temperature: constant temperature around 25° C.

mobile phase:

Solution A) 0.01 mol/L aqueous dipotassium hydrogen phosphate solution

Solution B) MeCN gradient program

TABLE 6

| Time (min) | Solution A (%) | Solution B (%) |
|---|---|---|
| 0 | 55 | 45 |
| 7 | 55 | 45 |
| 10 | 20 | 80 |
| 20 | 20 | 80 |
| 22 | 55 | 45 |
| 30 | 55 | 45 | flow rate: 1.0 ml/min retention time: (2S,3S)-TABF 7 min, (2R,3R)-TABF 15 min

Reference Example 2 tert-butyl 2-(3-bromo-2-fluorobenzyl)-3-oxopyrrolidine-1-carboxylate (TBFO)

tert-Butyl 3-oxopyrrolidine-1-carboxylate (TOPC) (96.8 g) 5 and toluene (630 ml) were placed into a reaction container, pyrrolidine (46.5 g) was added dropwise thereto at 40° C. or lower, and the mixture was stirred for 10 min. The reaction solution was concentrated to 350 ml. To the concentrate was added toluene (350 ml), and the mixture was concentrated to 350 ml. To the concentrate was added acetonitrile (630 ml), and tetrabutylammonium iodide (9.7 g) was added thereto. An acetonitrile solution (70 ml) of 2-bromo-6-bromomethyl-1-fluorobenzene (BBFB) (70 g) was added dropwise thereto at 25° C., and the mixture was stirred at 40° C. for 1.5 hr. Water (420 ml) and ethyl acetate (560 ml) were added thereto at 25° C., and the mixture was subjected to liquid separation. The organic layers were combined, water (350 ml) was added thereto, and the pH was adjusted to 3.7 by dropwise addition of 2N—HCl at 25° C. The reaction solution was subjected to liquid separation, and the organic layer was washed with 10% aqueous $Na_2S_2O_3$ solution (490 ml) and 10% aqueous NaCl solution (490 ml). The organic layer was concentrated to 210 ml, ethanol (350 ml) was added thereto, and the mixture was again concentrated to 210 ml. Ethanol (210 ml) was added thereto to give a TBFO ethanol solution.

Example 4 tert-butyl 2-(3-bromo-2-fluorobenzyl)-3-(methoxyimino)pyrrolidine-1-carboxylate (TBFM)

The TBFO ethanol solution (total amount) obtained in Reference Example 2 was placed into a reaction container, water (35 ml), sodium acetate (38.6 g) and $H_2NOMe$ HCl (39.3 g) were added thereto at 20° C., and the mixture was stirred at 55° C. for 1 hr. To the reaction solution were added ethyl acetate (700 ml) and water (700 ml) at 25° C., and the mixture was stirred, and subjected to liquid separation. The organic layer was washed with 0.5M HCl (700 ml), 5% aqueous $NaHCO_3$ solution (700 ml) and water (700 ml) at 25° C., and concentrated to 210 ml. To the concentrate was added cyclopentyl methyl ether (CPME) (700 ml), and the mixture was concentrated to 210 ml to give a TBFM 5 CPME solution.

Example 5 tert-butyl (2S,3S)-3-amino-2-(3-bromo-2-fluorobenzyl)pyrrolidine-1-carboxylate N-[(4-methylphenyl)sulfonyl]-L-phenylalanine salt ((2S,3S)-TABF (S)-PPSP)

$ZrCl_4$ (97.4 g) and chlorobenzene (126 ml) were placed into a reaction container, and suspended. THF (840 ml) was added dropwise thereto at 40° C. or lower, and the mixture was is stirred at 50° C. for 1 hr or longer. $NaBH_4$ (63.3 g) was added thereto by portions at 25° C., the used container was washed with THF (35 ml), and the mixture was stirred at 25° C. for 2 hr or longer. The TBFM CPME solution (total amount) obtained in Example 4 was added dropwise thereto at 25° C., the used container was washed with CPME (63 ml), and the mixture was stirred at 25° C. for 1 hr or longer. 1N—HCl (1246 ml) was added dropwise thereto at −5 to 20° C., and the used container was washed with CPME (63 ml). The mixture was stirred at 5° C. for 1 hr or longer. Rochelle salt ((+)-potassium sodium tartrate tetrahydrate) (472 g) was added thereto at −5 to 10° C., and the mixture was stirred at 5 to 10° C., and then stirred at 35° C., and subjected to liquid separation. To the aqueous layer was added ethyl acetate (630 ml), and the mixture was subjected to liquid separation. The organic layers were combined, and washed with 5% aqueous $NaHCO_3$ solution (623 ml) and 10% aqueous NaCl solution (623 ml), and concentrated to 224 ml. To the concentrate was added ethanol (315 ml), and the mixture was concentrated to 189 ml. To the concentrate was added ethanol (315 ml), the mixture was concentrated to 189 ml, and ethanol (168 ml) was added thereto. Separately, N-[(4-methylphenyl)sulfonyl]-L-phenylalanine ((S)-PPSP) (83.4 g) and ethanol (623 ml) were placed into another container, and the mixture was dissolved by heating to 55° C., and added dropwise to the TABF ethanol solution obtained above at 55° C., and the used container was washed with ethanol (21 ml). Seed crystals (91 mg) of (2S,3S)-TABF (S)-PPSP were added thereto at 55° C., and the mixture was stirred at 25° C. for 15 hr or longer. The crystals were collected by filtration, and dried under reduced pressure to give a crude (2S,3S)-TABF (S)-PPSP. As the above seed crystals, those that were naturally crystallized through the same process as described above were used.

Example 6 tert-butyl (2S,3S)-3-amino-2-(3-bromo-2-fluorobenzyl)pyrrolidine-1-carboxylate N-[(4-methylphenyl)sulfonyl]-L-phenylalanine salt ((2S,3S)-TABF (S)-PPSP)

The crude (2S,3S)-TABF (S)-PPSP (80 g) obtained in Example 5 was suspended in ethanol (1600 ml), and dissolved by heating to 70° C. or higher. The solution was cooled to 25° C., and stirred for 2 hr or longer, and the crystals were collected by filtration, and dried under reduced pressure to give (2S,3S)-TABF (S)-PPSP.

INDUSTRIAL APPLICABILITY

According to the production method of the present invention, (2S,3S)-3-amino-2-(3-bromo-2-fluorobenzyl)pyrrolidine having a protecting group at the 1-position can be obtained as N-[(4-methylphenyl)sulfonyl]-L-phenylalanine salt by a method suitable for industrial production.

This application is based on patent application No. 2019-209070 filed on Nov. 19, 2019 in Japan, the contents of which are encompassed in full herein.

The invention claimed is:

1. A method for producing N-[(4-methylphenyl)sulfonyl]-L-phenylalanine salt of (2S,3S)-3-amino-2-(3-bromo-2-fluorobenzyl)pyrrolidine having a protecting group at the 1-position, which comprises
    subjecting 2-(3-bromo-2-fluorobenzyl)-3-(methoxyimino)pyrrolidine having a protecting group at the 1-position to a reduction reaction; and
    subjecting the product to optical resolution using salt formation with N-[(4-methylphenyl)sulfonyl]-L-phenylalanine.

2. The method according to claim 1, wherein the reduction reaction is carried out in the presence of zirconium(IV) chloride.

3. A method for producing N-[(4-methylphenyl)sulfonyl]-L-phenylalanine salt of (2S,3S)-3-amino-2-(halo-substituted benzyl)pyrrolidine having a protecting group at the 1-position, which comprises
    subjecting 2-(halo-substituted benzyl)-3-(methoxyimino)pyrrolidine having a protecting group at the 1-position to a reduction reaction; and
    subjecting the product to optical resolution using salt formation with N-[(4-methylphenyl)sulfonyl]-L-phenylalanine.

4. The method according to claim 3, wherein the reduction reaction is carried out in the presence of zirconium(IV) chloride.

5. The method of claim 3 further comprising reacting 2-(halo-substituted benzyl)-3-oxopyrrolidine having a protecting group at the 1-position with O-methylhydroxylamine or a salt thereof to provide 2-(halo-substituted benzyl)-3-(methoxyimino)pyrrolidine.

* * * * *